US010983562B2

(12) United States Patent
Cho et al.

(10) Patent No.: US 10,983,562 B2
(45) Date of Patent: Apr. 20, 2021

(54) FLEXIBLE DISPLAY DEVICE

(71) Applicant: LG Display Co., Ltd., Seoul (KR)

(72) Inventors: Won-Jong Cho, Paju-si (KR);
Dae-Heung Lee, Paju-si (KR); Ji-Su Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/545,970

(22) Filed: Aug. 20, 2019

(65) Prior Publication Data
US 2020/0064886 A1   Feb. 27, 2020

(30) Foreign Application Priority Data
Aug. 22, 2018  (KR) .................. 10-2018-0097913

(51) Int. Cl.
*H05K 1/00* (2006.01)
*G06F 1/16* (2006.01)
*H04M 1/02* (2006.01)
*G09F 9/30* (2006.01)

(52) U.S. Cl.
CPC .......... *G06F 1/1652* (2013.01); *G06F 1/1616* (2013.01); *G09F 9/301* (2013.01); *H04M 1/0268* (2013.01)

(58) Field of Classification Search
USPC ...................................... 361/749
See application file for complete search history.

(56) References Cited

U.S. PATENT DOCUMENTS

| 2010/0244682 A1* | 9/2010 | Lee ..................... H01L 51/5281 313/512 |
| 2014/0065326 A1 | 3/2014 | Lee et al. |
| 2015/0146387 A1* | 5/2015 | Lee ...................... G06F 1/1679 361/749 |
| 2016/0014881 A1* | 1/2016 | Shin ..................... G06F 1/1616 361/749 |
| 2016/0271914 A1 | 9/2016 | Xie |
| 2018/0009197 A1* | 1/2018 | Gross ................... C03C 17/326 |

FOREIGN PATENT DOCUMENTS

| CN | 104070745 A | 10/2014 |
| CN | 104347000 A | 2/2015 |
| CN | 104680941 A | 6/2015 |
| CN | 104869749 A | 6/2015 |

(Continued)

OTHER PUBLICATIONS

China National Intellectual Property Administration, Office Action, CN Patent Application No. 201910752916.5, dated Mar. 2, 2021, 18 pages.

*Primary Examiner* — Andargie M Aychillhum
(74) *Attorney, Agent, or Firm* — Fenwick & West LLP

(57) ABSTRACT

A flexible display device includes: a display panel which display an image, and includes a first folding region folded or unfolded around a first folding axis, and first and second non-folding regions respectively located at both sides of the first folding region; and a cover window which is on the display panel, and includes a first cover portion having a first hardness and a second cover portion having a second hardness less than the first hardness, wherein the first cover portion is located corresponding to an outer folding portion a display surface of which is exposed to an outside.

13 Claims, 6 Drawing Sheets

(56) References Cited

FOREIGN PATENT DOCUMENTS

| | | |
|---|---|---|
| CN | 106328003 A | 1/2017 |
| CN | 106910823 A | 6/2017 |
| CN | 107003789 A | 8/2017 |
| CN | 107065255 A | 8/2017 |
| CN | 107820503 A | 3/2018 |
| CN | 107886847 A | 4/2018 |
| EP | 3208297 A1 | 8/2017 |
| WO | WO 2017/126886 A1 | 7/2017 |

\* cited by examiner

FLEXIBLE DISPLAY DEVICE

CROSS REFERENCE TO RELATED APPLICATIONS

The present application claims the priority benefit of Republic of Korea Patent Application No. 10-2018-0097913 filed in Republic of Korea on Aug. 22, 2018, which is hereby incorporated by reference in its entirety.

BACKGROUND

Field of Technology

The present disclosure relates to a flexible display device, and particularly, relates to a flexible display device which is extremely foldable and can improve durability.

Discussion of the Related Art

Recently, with the advent of an information-oriented society, a field of displays for processing and displaying a massive amount of information has rapidly advanced. Thus, various flat panel display devices have been developed and highlighted.

As examples of the flat panel display devices, there are a liquid crystal display (LCD) device, a plasma display panel (PDP) device, a field emission display (FED) device, an electroluminescence display (ELD) device, an organic light emitting diode (OLED) display device, and the like. The flat panel display devices exhibit excellent characteristics in terms of thin profile, light weight, and low power consumption thereof and thus have rapidly replaced the conventional cathode ray tube (CRT) displays.

Since such the flat panel display devices use a glass substrate to endure a high heat generated in production processes, there are limits to light weight, thin profile and flexibility.

Thus, a flexible display device, which is manufactured to maintain a display performance intactly using a substrate of a flexible material such as a plastic instead of a conventional glass substrate of non-flexibility even when it is curved or bent like paper, is rising as a next generation flat panel display device.

The flexible display device uses a thin film transistor (TFT) substrate which is made of a plastic material not a glass material, and may be categorized into an unbreakable display of a high durability, a bendable display to be bent without being broken, a rollable display, a foldable display, and the like. The flexible display device has advantages in use of space, interior decoration and design, and may be applied in various fields.

Recently, in order to realize ultra thin profile, light weight and large-sized display area, a bendable or foldable display device which is portable in a folded state and displays images in an unfolded state, has been researched actively.

The bendable or foldable display device may be applied to various devices, for example, a mobile device, such as mobile phone, ultra mobile PC, electronic book, or electronic newspaper, TV, monitor and the like.

A flexible display device, including the bendable or foldable display device, may include a display panel to display images, and a window member located in front of the display panel. The window member may include a polarization layer which serves to prevent a reflection of an external light, a touch film which supplies an input of a user's information through a touch on its screen, and a cover glass which protects the display panel.

In the flexible display device, since the window member is formed thicker than the display panel, for an outer folding with the window member being located outermost in the flexible display device, the window member is difficult to form at a folding region which is subjected to a compressive force and a contractile force a lot in folding and unfolding.

By the folding region where the window member is not formed, the flexible display device is very weak to an external impact.

Further, an image is difficult to display at the folding region, or even though an image is displayed, the image displayed at the folding region is different in brightness and the like from an image displayed at a non-folding region. Thus, the folding region is perceived and this results in reduction of continuity of image, or a touch is not recognized at the folding region and thus a user is inconvenienced.

SUMMARY

Accordingly, the present disclosure is directed to a flexible display device that substantially obviates one or more of the problems due to limitations and disadvantages of the related art.

An advantage of the present invention is to provide a flexible display device which can improve durability. Further, another advantage of the present disclosure is to provide a flexible display device which can solve reduction of continuity of image and no touch recognition due to a folding region. Further, another advantage of the present disclosure is to provide a flexible display device which can have a thin profile. Further, another advantage of the present invention is to provide a flexible display device which can is extremely foldable.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present disclosure, as embodied and broadly described herein, a flexible display device includes: a display panel which display an image, and includes a first folding region folded or unfolded around a first folding axis, and first and second non-folding regions respectively located at both sides of the first folding region; and a cover window which is on the display panel, and includes a first cover portion having a first hardness and a second cover portion having a second hardness less than the first hardness, wherein the first cover portion is located corresponding to an outer folding portion a display surface of which is exposed to an outside.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to exemplary embodiments, examples of which are illustrated in the accompanying drawings. The same reference numbers may be used throughout the drawings to refer to the same or like parts.

Figure 1A:
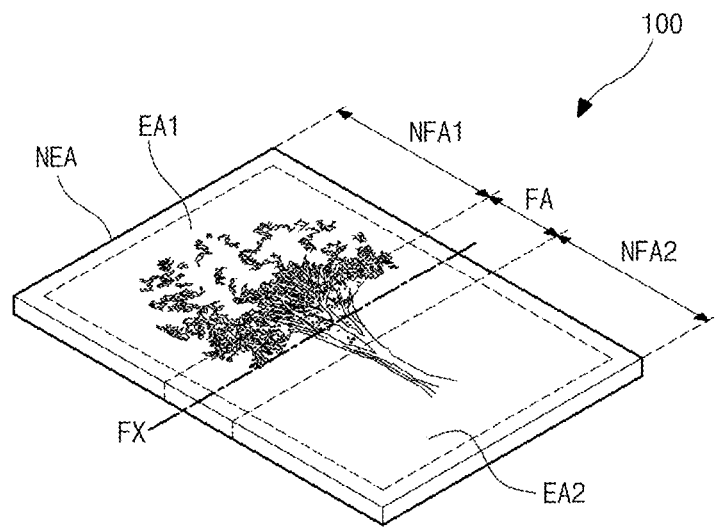
FIGS. 1A and 1B are perspective views schematically illustrating an unfolded state and a folded state of a flexible display device according to a first embodiment of the present disclosure.
Figure 1B:
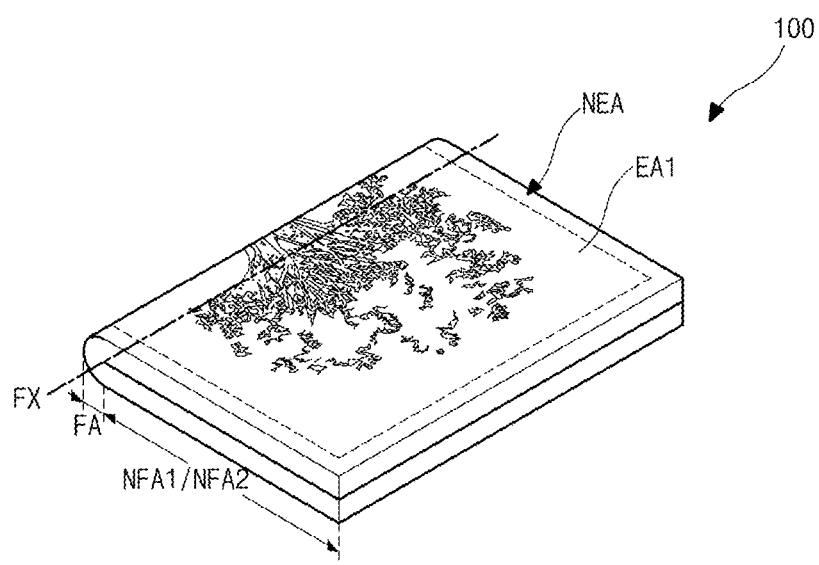

FIGS. 1A and 1B are perspective views schematically illustrating an unfolded state and a folded state of a flexible display device according to a first embodiment of the present disclosure.

In this embodiment, a foldable display device is described as a flexible display device 100 by way of example. This embodiment may be applied to other type display devices, for example, a curved display device, a bendable display device, a rollable display device, a stretchable display device, and the like.

The flexible display device 100 may be used for a large-sized electronic device, such as TV, an exterior advertising board, or the like, and be used for a small- and medium-sized electronic device, such as a mobile phone, a personal computer, a laptop computer, a personal digital terminal, a vehicle navigator, a game console, a portable electronic device, a wristwatch-style electronic device, a camera, or the like.

Referring to FIG. 1A, the flexible display device 100 may include a plurality of regions which are defined on a display surface and separated from each other. The flexible display device 100 may be divided into a display region EA1 and EA2 and a non-display region NEA. The display region EA1 and EA2 is a region where an image is displayed, and the non-display region NEA is a region, adjacent to the display region EA1 and EA2, where an image is not displayed.

The display region EA1 and EA2 may be divided into first and second display regions EA1 and EA2 with respect to a folding axis FX, and the non-display region NEA may be located around the display region EA1 and EA2.

The flexible display device 100 may include a folding region FA which is folded along the folding axis FX, a first non-folding region NFA1, including the first display region EA1, which is not folded, and a second non-folding region NFA2, including the second display region EA2, which is not folded.

Accordingly, referring to FIG. 1B, as the second non-folding region NFA2 may be rotated clockwise around the folding axis FX, the flexible display device 100 may be in an outer folding state such that the first and second display regions EA1 and EA2 face away from each other i.e., face in opposite outer directions.

The flexible display device 100 of this embodiment may be extremely folded outwardly, and may have a window member (200 of FIG. 2A) at the folding region FA and the non-folding regions NFA1 and NFA2 as well. Thus, durability may be improved.

Accordingly, reduction of continuity of image and no touch recognition by a folding region may be solved. Further, the flexible display device may be configured to have a thin profile. This is described in more detail further with reference to FIGS. 2A and 2B.

Figure 2A:
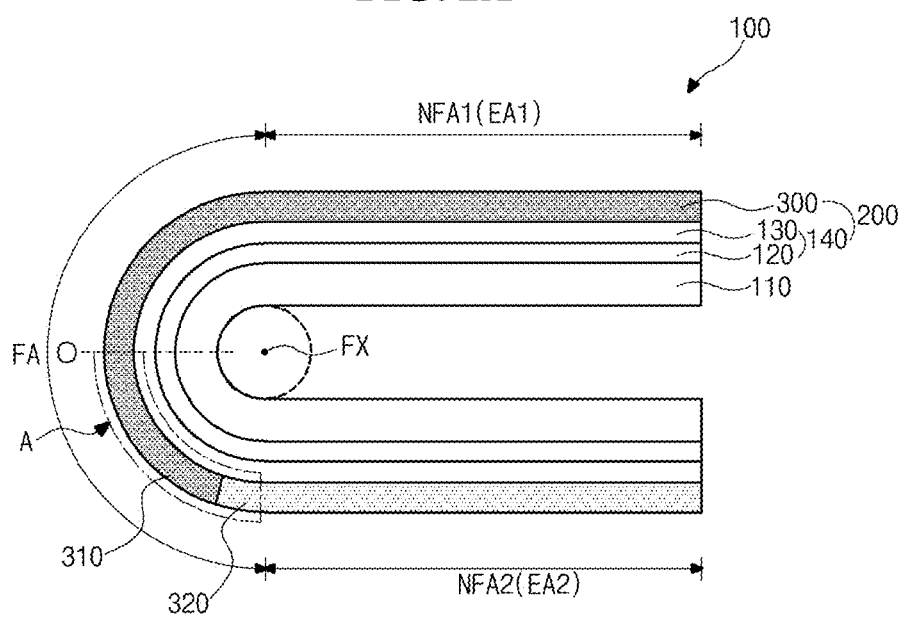
FIGS. 2A and 2B are cross-sectional views schematically illustrating a folded state and an unfolded state of a flexible display device according to a first embodiment of the present disclosure.
Figure 2B:
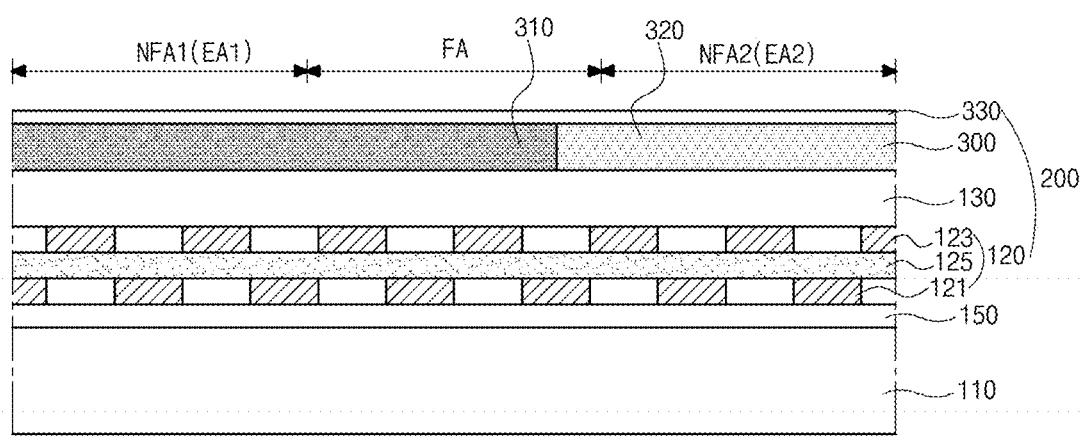

FIGS. 2A and 2B are cross-sectional views enlarging a flexible display device according to a first embodiment of the present disclosure. FIGS. 2A and 2B show folded state and unfolded state of a flexible display device according to a first embodiment of the present disclosure.

Referring to FIGS. 2A and 2B, the flexible display device 100 may be in an outer folding state such that the first display region EA1 of the first non-folding region NFA1 and the second display region EA2 of the second non-folding region NFA2 face away from each other i.e., face in opposite outer directions.

The flexible display device 100 may include a display panel 110 to display an image, and a window member 200 in front of a display surface of the display panel 110. The window member 200 may include a multi panel 140 including a touch layer 120 and a polarization layer 130, and a cover window 300 which serves to protect the display panel 110.

For the purpose of explanations, directions in the drawings may be defined such that assuming that a display surface of the display panel 110 is assumed to face front, the cover window 300 is located in front of the display panel 110, and the multi panel 140 is located between the display panel 110 and the cover window 300.

The display panel 110 may use an organic light emitting diode (OLED) panel as a leader of a flexible display panel which can maintain a display performance intactly even when it is curved or bent like paper. In the display panel 110 configured as the OLED panel, a substrate where a driving thin film transistor (TFT) and a light emitting diode are formed may be encapsulated by a protection film.

The multi panel 140 may be located on the display panel 110. In the multi panel 140, the touch layer 120 may obtain coordinate information of a touch input position.

In the touch layer 120, a first touch electrode 121 and a second touch electrode 123 may be spaced apart from each other with a dielectric layer 125 to form a touch sensor.

The polarization layer 130 may be located on the touch layer 120. As the display panel 110 may use the OLED panel, the polarization layer 130 may serve to prevent reduction of contrast which is caused by reflection of an external light toward the display panel 110.

Since the multi panel 140 of this embodiment may be configured with the touch layer 120 and the polarization layer 130 which are formed integrally, an additional optical adhesive layer may not be required to be formed between the touch layer 120 and the polarization layer 130. Thus, a thickness of the multi panel 140 may be 40 µm or less. This may be explained in detail later.

The cover window 300 may be located on the multi panel 140 including the touch layer 120 and the polarization layer 130 to protect the display panel 110. The cover window 300 may protect the display panel 110 and the multi panel 140 against an external light, and may transmit a light emitted from the display panel 110 so that an image produced by the display panel 110 is seen from the outside.

The cover window 300 may be divided into a first cover portion 310 having a first hardness and a second cover portion 320 having a second hardness less than the first hardness. A surface hardness (i.e., pencil hardness) of the first hardness may be 9H or greater, and a surface hardness of the second hardness may be 7H or less.

The first cover portion 310 of the first hardness may be formed of a glass material, and particularly, may include a non-alkali glass, and more particularly, may include aluminosilicate glass. The aluminosilicate glass has excellent scratch resistance and damage resistance.

The first cover portion 310 may have a thickness of 30 µm or less. With a surface hardness of 9H or greater, the first cover portion 310 may have a prescribed elastic modulus and thus have a flexible property.

In other words, while the first cover portion 310 may have a high hardness, the first cover portion 310 may has a flexibility not to form cracks even when it is fully folded.

In case that the first cover portion 310 may have a thickness of 31 µm or greater, it may be difficult for the first cover portion 310 to have a flexibility, and thus a folding of the flexible display device may be difficult.

The first cover portion 310 may have an elastic modulus of 20 GPa to 100 GPa.

The second cover portion 320 may be formed of one of polymethylmethacrylate (PMMA), polycarbonate (PC), cycloolefin polymer (COP), polyethylene terephthalate (PET), polyimide (PI), or polyaramid (PA).

The second cover portion 320 may be formed to have a thickness of 30 µm or less in view of a step with the first cover portion 310. In order for the thin second cover portion 320 to have a surface hardness of 7H or greater, the second cover portion 320 may further include a hard coating layer.

Even though not shown in the drawings, the second cover portion 320 may be formed with a plurality of layers that include a first layer made of PI and a second layer as a hard coating layer. Alternatively, the second cover portion 320 may be formed with a single layer that is made of PI and hard coating ingredients contained in the PI base.

The second cover portion 320 may have an elastic modulus of 20 GPa to 100 GPa. As an elastic modulus may be in inverse proportion to a hardness, the second cover portion 320 may have a hardness less than that of the first cover portion 310 so that the second cover portion 320 may have an elastic modulus greater than that of the first cover portion 310.

In order to prevent a surface step produced by the first and second cover portions 310 and 320 that are made of different materials, a surface treatment layer 330 for a surface planarization is further formed on the first and second cover portions 310 and 320.

With prevention of the surface step of the first and second cover portions 310 and 320, the surface treatment layer 330 may have at least one of an anti-reflection function, an anti-glare function, and an anti-finger function.

The surface treatment layer 330 may be formed to have a thickness of about 5 µm. In case that the surface treatment layer 330 may have a thickness over 5 µm, a total thickness of a cover window 300 including the surface treatment layer 330 may be great. Thus, in one embodiment the surface treatment layer 330 has a thickness of about 5 µm that is a minimum to achieve an object and effect as desired.

As the first cover portion 310 may have a high surface hardness, the first cover portion 310 might be located over an entire display surface of the flexible display device 100 to improve durability of the flexible display device 100. However, since the first cover portion 310 of a glass material is more expensive than the second cover portion 320, in one embodiment the first cover portion 310 is formed corresponding to the first non-folding region NFA1 and the folding region FA of an outer folding portion of the flexible display device 100 which an external impact is applied to when folded.

In other words, when an outer folding happens, the outer-folded flexible display device 100 may be configured to be divided into a non-emission portion, which meets a support portion, such as a table or user's hand, that supports a surface of the flexible display device 100, and a main emission portion which provides a user with an image. By a user's touch and the like, the main emission portion gets an external impact more than the non-emission portion.

Accordingly, in the flexible display device 100 of this embodiment, the first cover portion 310 of the cover window 300 may be located at the first non-folding region NFA1 and the folding region FA of the outer folding portion of the flexible display device 100 which corresponds to the main emission portion, and the second cover portion 320 may be located at the second non-folding region NFA2 that may serve as the non-emission region which an external impact is relatively less applied to.

Particularly, regarding the folding region FA, instead of the first cover portion 310 entirely covering the folding region FA, the second cover portion 320 being located at a region, out of the folding region FA, where a stress is produced relatively less when folded, may be preferable.

In the flexible display device 100, when folded and unfolded, a stress is produced at the folding region FA according to an external force. Ideally, in case that the folding region FA is folded to have a uniform folding radius with respect to the folding axis FX, a stress is most at a center portion O of the folding region FA, and an intensity of a stress decreases in a direction from the folding region FA to the non-folding region NFA1 and NFA2.

In the flexible display device 100 of this embodiment, the first cover portion 310 may be formed corresponding to the first non-folding region NFA1 and the folding region FA as an outer folding portion of the flexible display device 100 which an external impact is relatively more applied to when folded. Accordingly, the first cover portion 310 may be located at a region from the first non-folding region NFA1 to the center portion O of the folding region FA, and an optimum position of the first cover portion 310 in a region A from the center portion O of the folding region FA to the second non-folding region NFA2 may preferably meet following formulas 1 and 2.

In other words, when a region A may be defined to be divided into 8 equal parts having the same width, since a stress applied to the region A may relatively decrease from a fourth part, a region, in the region A, where the first cover portion 310 may located, may be defined according to a radius of curvature of the folding region FA by the following formulas 1 and 2.

$$2\pi R * \frac{1}{4} = 1.57R \text{ (mm)}.$$ Formula 1:

In the formula 1, R is a radius of curvature and is defined in millimeters, and ¼ is a distance from the center portion O of the folding region FA to the second non-folding region NFA2 and is a ½ of the folding region FA.

$$1.57R \text{ (mm)} * \tfrac{5}{8} = 0.98R \text{ (mm)}. \qquad \text{Formula 2:}$$

In the formula 2, when dividing the region A into 8 equal parts, ⅝ indicates a distance to a ⅝ point from the center portion O of the folding region FA.

By the formulas 1 and 2, the first cover portion 310 may be located at the first non-folding region NFA1, from the first non-folding region NFA1 to the center portion O of the folding region FA, and to 0.98R (mm) from the center portion O of the folding region FA, and other region may be occupied by the second cover portion 320.

Accordingly, in the flexible display device 100 of this embodiment, since the first cover portion 310 having an elastic modulus and a surface hardness of 9H or greater as well may be located at the first non-folding region NFA1 and the folding region FA as the outer folding portion which an external impact is relatively more applied to, the extreme outer folding may be possible, and durability may be improved.

Particularly, the cover window 300 may be located at the folding region FA and the first and second non-folding regions NFA1 and NFA2 as well, and thus durability of the flexible display device 100 may be further improved. Accordingly, reduction of continuity of image and no touch recognition by the folding region FA may be solved.

Further, since the cover window 300 may be formed with the separated first and second cover portions 310 and 320, production cost may be reduced along the above technical advantages, and thus production efficiency may be improved.

The display panel 110 and the multi panel 140 may be attached to each other using the optical adhesive layer 150, and the cover window 300 having the first and second cover portions 310 and 320 may be configured integrally with the multi panel 140 by a roll to roll method or roll to sheet method, and thus the flexible display device 100 may be modulized integrally.

The optical adhesive layer 150 may be formed of an optically cleared adhesive (OCA) and at a thickness of 10 µm to 25 µm. In this regard, in case that a thickness of the optical adhesive layer 150 may be 10 µm or less, an adhesive strength is weak and thus it is difficult to integrally modulize the display panel 110 and the multi panel 140. In case that a thickness of the optical adhesive layer 150 may be 25 µm or greater, a folding of the flexible display device 100 is difficult.

Thus, the flexible display device 100 may have a thin profile.

Figure 3A:
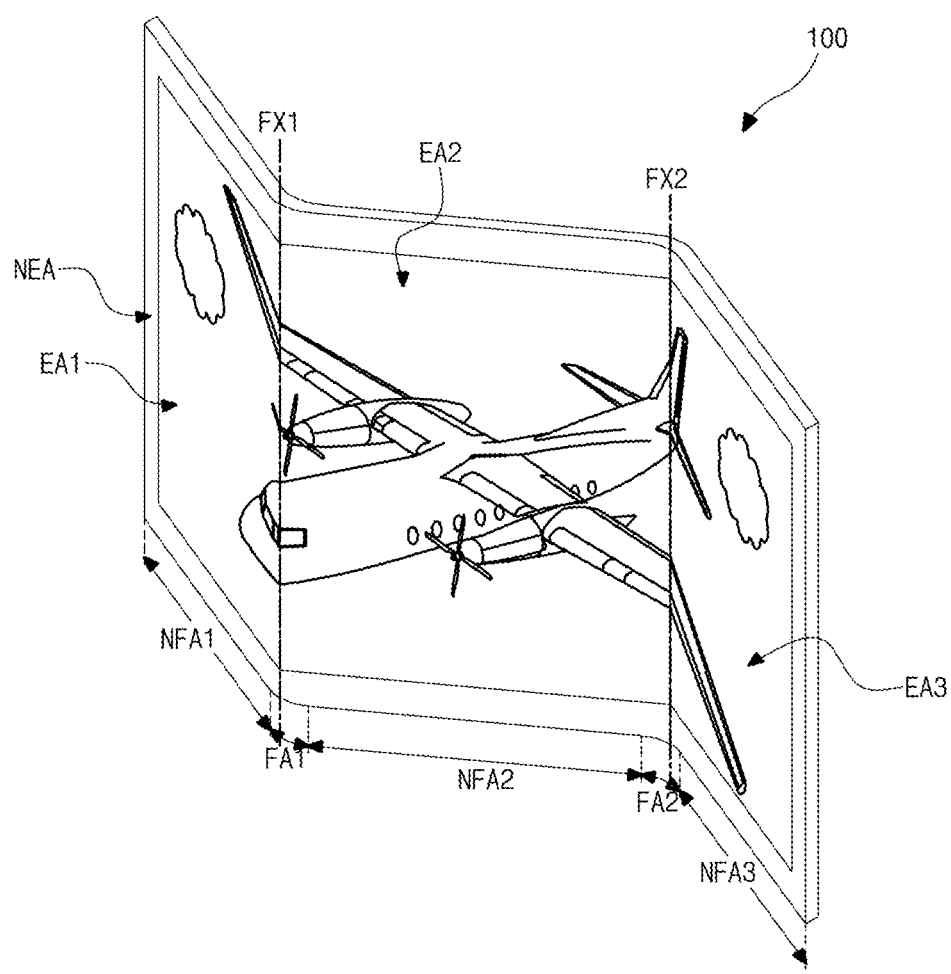
FIG. 3A is a perspective view schematically illustrating an unfolded state of a flexible display device according to a second embodiment of the present disclosure.
Figure 3B:
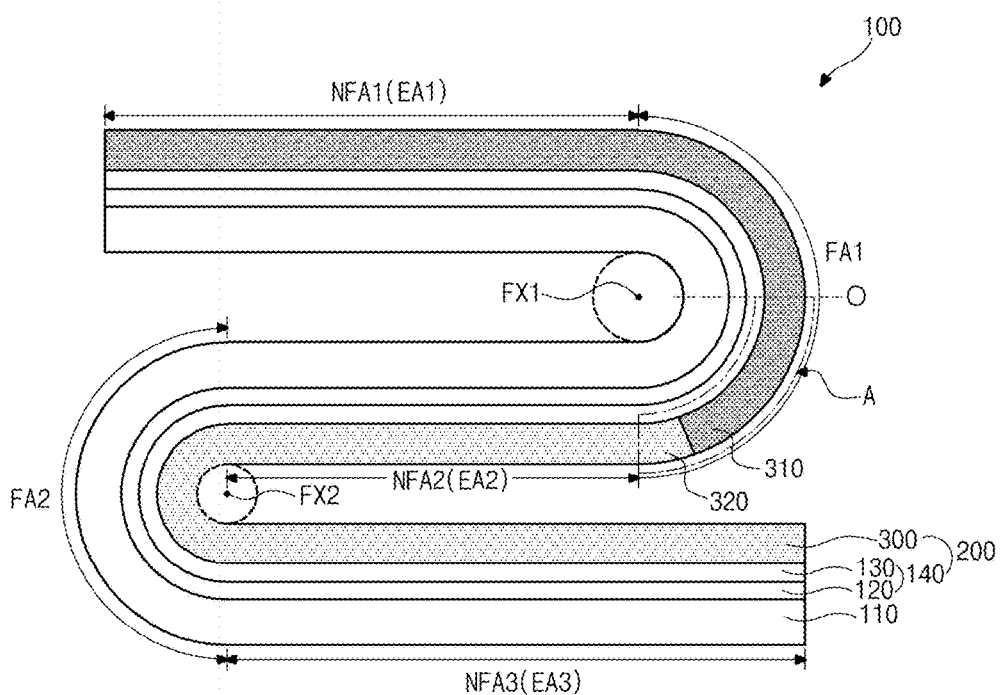
FIGS. 3B and 3C are cross-sectional views schematically illustrating a folded state and an unfolded state of a flexible display device according to a second embodiment of the present disclosure.
Figure 3C:
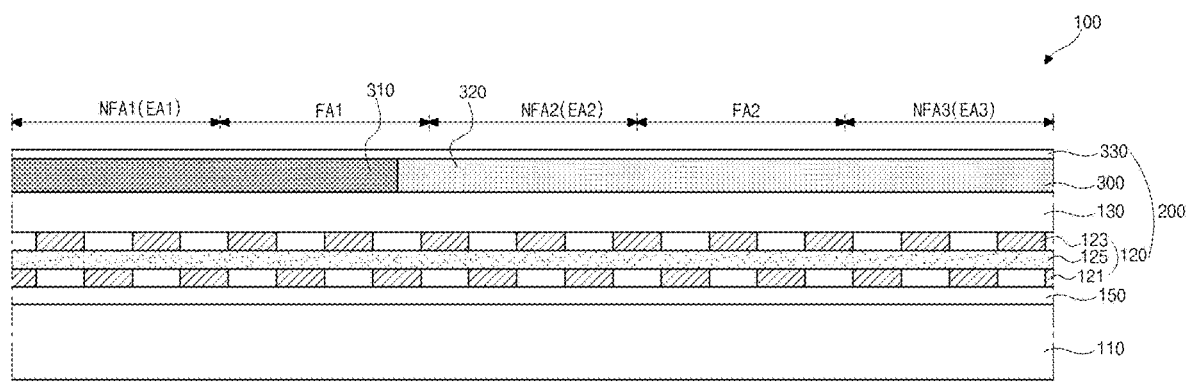

FIG. 3A is a perspective view schematically illustrating an unfolded state of a flexible display device according to a second embodiment of the present invention, and FIGS. 3B and 3C are cross-sectional views enlarging a flexible display device according to a second embodiment of the present invention. FIGS. 3B and 3C show folded state and unfolded state of a flexible display device according to a second embodiment of the present invention.

Figure 3D:
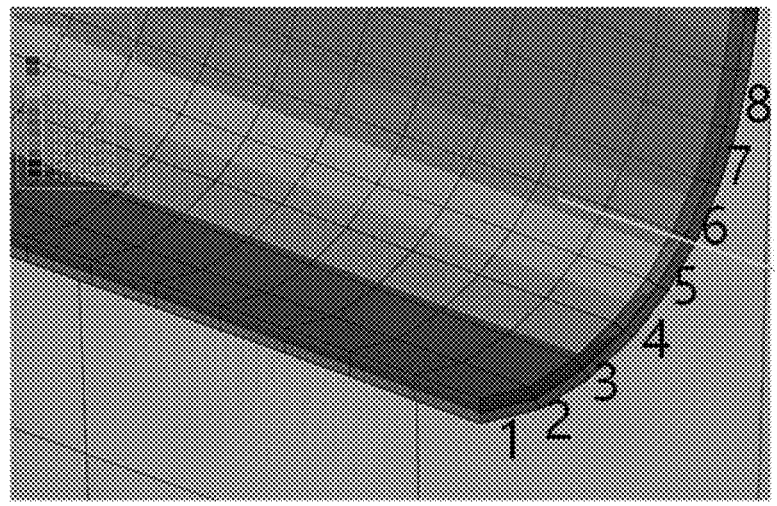
FIG. 3D is a view illustrating a simulation result of measuring stress applied to a folding region.

FIG. 3D is a view illustrating a simulation result of measuring stress applied to a folding region (a region A).

Explanations of parts similar to parts of the first embodiment may be omitted.

Referring to FIG. 3A, the flexible display device 100 may include a plurality of regions which are defined on a display surface and separated from each other. The flexible display device 100 may be divided into a display region EA1, EA2 and EA3 and a non-display region NEA. The display region EA1, EA2 and EA3 is a region where an image is displayed, and the non-display region NEA is a region, adjacent to the display region EA1, EA2 and EA3, where an image is not displayed.

The display region EA1, EA2 and EA3 may be divided into first, second and third display regions EA1, EA2 and EA3 with respect to first and second folding axes FX1 and FX2, and the non-display region NEA may be located around the display region EA1, EA2 and EA3.

The flexible display device 100 may include first and second folding regions FA1 and FA2 which are folded along the first and second folding axes FX1 and FX2 respectively, a first non-folding region NFA1, including the first display region EA1, which is not folded, a second non-folding region NFA2, including the second display region EA2, which is not folded, and a third non-folding region NFA3, including the third display region EA3, which is not folded.

Accordingly, referring to FIG. 3B, in the flexible display device 100, as the second non-folding region NFA2 may be rotated clockwise around the first folding axis FX1, the first and second display regions EA1 and EA2 face away from each other so that the first and second non-folding regions NFA1 and NFA2 may be in an outer folding state. Further, as the third non-folding region NFA3 may be rotated counterclockwise around the second folding axis FX2, the second and third display regions EA2 and EA3 face each other so that the second and third non-folding regions NFA2 and NFA3 may be in an inner folding state.

The flexible display device 100 of this embodiment may be extremely folded outwardly and inwardly, and may have a window member 200 at the folding regions FA1 and FA2 and the non-folding regions NFA1, NFA2 and NFA3 as well. Thus, durability may be improved.

In other words, the flexible display device 100 may be folded outwardly around the first folding axis FX1 such that the first display region EA1 of the first non-folding region NFA1 and the second display region EA2 of the second non-folding region NFA2 face away from each other, and may also be folded inwardly around the second folding axis FX2 such that the second display region EA2 of the second non-folding region NFA2 and the third display region EA3 of the third non-folding region NFA3 face each other.

A region where a display surface of the flexible display device 100 is exposed to the outside when folded may be defined as an outer folding portion, and a region where a display surface of the flexible display device 100 is located at an inner side when folded may be defined as an inner folding portion.

The flexible display device 100 may include a display panel 110 to display an image, and a window member 200 in front of a display surface of the display panel 110. The window member 200 may include a multi panel 140 including a touch layer 120 and a polarization layer 130, and a cover window 300 which serves to protect the display panel 110.

For the purpose of explanations, directions in the drawings may be defined such that assuming that a display surface of the display panel 110 is assumed to face front, the cover window 300 is located in front of the display panel 110, and the multi panel 140 is located between the display panel 110 and the cover window 300.

The display panel 110 may use a liquid crystal display (LCD) panel, a plasma display panel (PDP), a field emission display (FED) panel, an electroluminescence display (ELD) panel, or an organic light emitting diode (OLED) panel. In one embodiment, the display panel 110 may use an organic light emitting diode (OLED) panel as a leader of a flexible display panel which can maintain a display performance intactly even when it is curved or bent like paper.

The OLED panel is a self-luminescent type display panel and does not require a backlight unit used for an LCD device which is not a non-self luminescent type display device. Thus, the OLED panel may have a light weight and a thin profile.

In addition, the OLED panel may have advantages in viewing angle, contrast ratio, and power consumption as compared with the LCD panel. Furthermore, the OLED panel may be driven with a low direct current (DC) voltage and have rapid response speed. Moreover, since inner elements of the OLED panel have a solid phase, the OLED panel may have high durability against an external impact and have a wide available temperature range.

Specifically, since the OLED panel is manufactured through a simple process, manufacturing costs may be reduced as compared with the LCD panel.

In the display panel 110 configured as the OLED panel, a substrate where a driving thin film transistor (TFT) and a light emitting diode are formed may be encapsulated by a protection film.

Even though not shown in the drawings, the driving TFT may be formed in each pixel region on the substrate, a first electrode may be formed on the driving TFT and be connected to each driving TFT, an organic light emitting layer emitting its specific color light may be formed on the first electrode, and a second electrode may be formed on the organic light emitting layer.

The first and second electrode and the organic light emitting layer between the first and second electrodes form an organic light emitting diode. The first electrode may serve as an anode, and the second electrode may serve as a cathode.

The multi panel 140 may be located on the display panel 110. In the multi panel 140, the touch layer 120 may obtain a coordinate information of a touch input position.

In the touch layer 120, a first touch electrode 121 and a second touch electrode 123 may be spaced apart from each other with a dielectric layer 125 to form a touch sensor. When an input means such as a finger or pen contacts a position of the touch sensor, the first and second touch electrodes may be electrically connected to each other, a voltage changed by a resistance of the touched position may be read out, and a control device may find a coordinate of the position according to the change of voltage.

The first and second touch electrodes 121 and 123 may include a transparent conductive oxide material, for example, ITO, IZO, ZnO or ITZO. Alternatively, the first and second touch electrodes 121 and 123 may include a metal material, for example, Mo, Ag, Ti, Cu, Al or an alloy thereof.

The polarization layer 130 may be located on the touch layer 120. As the display panel 110 may use the OLED panel, the polarization layer 130 may serve to prevent reduction of contrast which is caused by reflection of an external light toward the display panel 110.

In other words, by locating the polarization layer 130, which may block an external light, in a transmission direction of a light which is emitted from the organic light emitting layer in a driving mode of the display panel 110 using the OLED panel to display an image, a contrast may be improved.

The polarization layer 130 may be formed using a circular polarization plate, which may include a phase retardation layer and a linear polarization layer. The phase retardation layer and the linear polarization layer may be stacked in such an order that the linear polarization layer is located close to an incidence side of an external light and the phase retardation layer is located at an inner side of the linear polarization layer.

The phase retardation layer may be configured using a quarter wave plate (QWP) having a $\lambda/4$ retardation value. The linear polarization layer has a polarizing axis to linearly polarize a light in a direction of the polarizing axis.

In detail, the linear polarization layer transmits a light parallel with the polarizing axis, and absorbs a light not parallel with the polarizing axis. Accordingly, when a light passes through the linear polarization layer, a light is linearly polarized in a direction of the polarizing axis.

Since the multi panel 140 of this embodiment may be configured with the touch layer 120 and the polarization layer 130 which are formed integrally, an additional optical adhesive layer may not be required to be formed between the touch layer 120 and the polarization layer 130. Thus, a thickness of the multi panel 140 may be 40 µm or less. This may be explained in detail later.

The cover window 300 may be located on the multi panel 140 including the touch layer 120 and the polarization layer 130 to protect the display panel 110. The cover window 300 may protect the display panel 110 and the multi panel 140 against an external light, and may transmit a light emitted from the display panel 110 so that an image produced by the display panel 110 is seen from the outside.

The cover window 300 may be divided into a first cover portion 310 having a first hardness and a second cover portion 320 having a second hardness less than the first hardness. A surface hardness (i.e., pencil hardness) of the first hardness may be 9H or greater, and a surface hardness of the second hardness may be 7H or less.

The first cover portion 310 of the first hardness may be formed of a glass material, and particularly, may include a non-alkali glass, and more particularly, may include aluminosilicate glass. The aluminosilicate glass has excellent scratch resistance and damage resistance.

The first cover portion 310 may have a thickness of 30 µm or less. With a surface hardness of 9H or greater, the first cover portion 310 may have a prescribed elastic modulus and thus have a flexible property.

In other words, while the first cover portion 310 may have a high hardness, the first cover portion 310 may has a flexibility not to form cracks even when it is fully folded.

R means a curvature and may be defined as a radius of curvature that indicates a curvature of an arc of a circle having a radius of R. 1R mean an arc of a circle having a radius of 1 mm.

In case that the first cover portion 310 may have a thickness of 31 µm or greater, it may be difficult for the first cover portion 310 to have a flexibility, and thus a folding of the flexible display device may be difficult.

The first cover portion 310 may have an elastic modulus of 20 GPa to 100 GPa.

The second cover portion 320 may be formed of one of polymethylmethacrylate (PMMA), polycarbonate (PC), cycloolefin polymer (COP), polyethylene terephthalate (PET), polyimide (PI), or polyaramid (PA).

The second cover portion 320 may be formed to have a thickness of 30 µm or less in view of a step with the first cover portion 310. In order for the thin second cover portion 320 to have a surface hardness of 7H or greater, in one embodiment the second cover portion 320 further includes a hard coating layer.

Even though not shown in the drawings, the second cover portion 320 may be formed with a plurality of layers that include a first layer made of PI and a second layer as a hard coating layer. Alternatively, the second cover portion 320 may be formed with a single layer that is made of PI and hard coating ingredients contained in the PI base.

The second cover portion 320 may have an elastic modulus of 20 GPa to 100 GPa. As an elastic modulus may be in inverse proportion to a hardness, the second cover portion 320 may have a hardness less than that of the first cover portion 310 so that the second cover portion 320 may have an elastic modulus greater than that of the first cover portion 310.

In order to prevent that a surface step is produced by the first and second cover portions 310 and 320 that are made of different materials, a surface treatment layer 330 for a surface planarization is further formed on the first and second cover portions 310 and 320.

With prevention of the surface step of the first and second cover portions 310 and 320, the surface treatment layer 330 may have at least one of an anti-reflection function, an anti-glare function and an anti-finger function.

The surface treatment layer 330 may be formed to have a thickness of about 5 μm. In case that the surface treatment layer 330 may have a thickness over 5 μm, a total thickness of a cover window 300 including the surface treatment layer 330 may be great. Thus, the surface treatment layer 330 has a thickness of about 5 μm that is a minimum to achieve an object and effect as desired.

The flexible display device 100 of this embodiment may be configured to include an outer folding portion where a display surface is exposed to the outside when folded and an inner folding portion where a display surface is located at an inner side when folded. Accordingly, the first cover portion 310 of a first hardness may be located corresponding to the outer folding portion, and the second cover portion 320 of a second hardness less than the first hardness may be located corresponding to the inner folding portion.

In detail, when the flexible display device 100 is folded, stresses in opposite directions are respectively applied to the outer folding portion and the inner folding portion.

In other words, with respect to a front surface (i.e., a display surface) of the flexible display device 100, a tensile stress is applied to the outer folding portion while a compressive stress is applied to the inner folding portion.

When the opposite stresses are applied, a TFT of the display panel 110 may be damaged or cracks may be generated at a signal line of the display panel 110 connected to each pixel region, and delamination between layers of the display panel 110 may be produced. Further, cracks may be generated at the touch electrodes 121 and 123 or a signal line of the touch layer 120.

The tensile stress may more affect generation of such the crack. Thus, in order to offset the tensile stress, the cover window 300 having a high elastic modulus may be located at the front surface of the flexible display device 100.

In this regard, in the flexible display device 100 of this embodiment, since the outer folding portion is entirely exposed to the outside, an external impact is relatively more applied to the outer folding portion. Thus, the outer folding portion may need a high elastic modulus and a high hardness as well.

Accordingly, the first cover portion 310 having a first hardness may be located at the outer folding portion, and the second cover portion 320 having a relatively greater elastic modulus may be located at the inner folding portion.

Since the second cover portion 320 is cheaper than the first cover portion 310, the first cover portion 310 may be formed corresponding to the outer folding portion of the flexible display device 100. Thus, production cost may be reduced, and as a result, production efficiency may be improved.

Particularly, regarding the outer folding portion, instead of the first cover portion 310 entirely covering the first folding region FA1, the second cover portion 320 extending over a region, out of the folding region FA, where a stress is produced relatively less when folded, may be preferable.

A stress means a resistance force generated in a material corresponding to a magnitude of a load (i.e., an external force), such as compression, tension, bending, twisting or the like, when the load is applied to the material.

A stress increases as an external force increases, but there is a limit to a stress. When a stress reaches an inherent limit of a material, a material is resistless to an external force and is destroyed finally. A unit stress means a stress per a unit area, and hereinafter, a stress means a unit stress.

In the flexible display device 100, when folded and unfolded, stresses are produced at the first and second folding regions FA1 and FA2 according to an external force. Ideally, in case that the first and second folding regions FA1 and FA2 are folded to each have a uniform folding radius with respect to the first and second folding axes FX1 and FX2, stresses are most at center portions O of the first and second folding regions FA1 and FA2, and intensities of stresses decrease in a direction from the first and second folding regions FA1 and FA2 to the first to third non-folding regions NFA1 to NFA3.

This refers to FIG. 3D, in which a decrease of stress occurs from the bottom of the figure towards the top of the figure.

In the flexible display device 100 of this embodiment, the first cover portion 310 may be formed corresponding to the first non-folding region NFA1 and the first folding region FA1 as an outer folding portion of the flexible display device 100 which an external impact is relatively more applied to when folded. Accordingly, the first cover portion 310 may be located at a region from the first non-folding region NFA1 to the center portion O of the first folding region FA1, and an optimum position of the first cover portion 310 in a region A from the center portion O of the first folding region FA1 to the second non-folding region NFA2 may preferably meet following formulas 3 and 4.

In other words, when a region A may be defined to be divided into 8 equal parts having the same width, since a stress applied to the region A may relatively decrease from a fourth part, a region, in the region A, where the first cover portion 310 may located, may be defined according to a radius of curvature of the first folding region FA1 by the following formulas 3 and 4.

$$2\pi R * 1/4 = 1.57R \text{ (mm)}. \qquad \text{Formula 3:}$$

In the formula 3, R is a radius of curvature and is defined in millimeters, and ¼ is a distance from the center portion O of the first folding region FA1 to the second non-folding region NFA2 and is a ½ of the first folding region FA1.

$$1.57R \text{ (mm)} * 5/8 = 0.98R \text{ (mm)}. \qquad \text{Formula 4:}$$

In the formula 4, when dividing the region A into 8 equal parts, ⅝ indicates a distance to a ⅝ point from the center portion O of the first folding region FA1.

By the formulas 3 and 4, the first cover portion 310 may be preferably located at the first non-folding region NFA1, from the first non-folding region NFA1 to the center portion O of the first folding region FA1, and to 0.98R (mm) from the center portion O of the first folding region FA1, and other region may be occupied by the second cover portion 320.

Accordingly, in the flexible display device 100 of this embodiment, since the first cover portion 310 having a prescribed elastic modulus and a surface hardness of 9H or greater as well may be located at the first non-folding region NFA1 and the first folding region FA1 as the outer folding portion which an external impact is relatively more applied to, the extreme outer folding may be possible, and durability may be improved.

The cover window 300 having a high hardness of at least 7H or at least 9H has an excellent scratch resistance. A scratch resistance of the cover window 300 is evaluated by measuring a number of scratches which occurs at a surface of the cover window 300 when a steel wool travels back and forth under a load of 500 gf/cm$^2$ on the cover window 300. The evaluation result is that even when travelling back and forth is conducted 3000 or more times, scratches does not occur and it is confirmed that the cover window 300 has an excellent mechanical property of a scratch resistance and the like.

Accordingly, the flexible display device 100 of this embodiment may have an improved durability by the cover window 300.

Particularly, the cover window 300 may be located at the first and second folding regions FA1 and FA2 and the first to third non-folding regions NFA1 to NFA3 as well, and thus durability of the flexible display device 100 may be further improved. Accordingly, reduction of continuity of image and no touch recognition by the first and second folding regions FA1 and FA2 may be solved.

Further, since the cover window 300 may be formed with the separated first and second cover portions 310 and 320, production cost may be reduced along the above technical advantages, and thus production efficiency may be improved.

The display panel 110 and the multi panel 140 may be attached to each other using the optical adhesive layer 150, and the cover window 300 having the first and second cover portions 310 and 320 may be configured integrally with the multi panel 140 by a roll to roll method or roll to sheet method, and thus the flexible display device 100 may be modulized integrally.

The optical adhesive layer 150 may be formed of an optically cleared adhesive (OCA) and at a thickness of 10 µm to 25 µm. In this regard, in case that a thickness of the optical adhesive layer 150 may be 10 µm or less, an adhesive strength is weak and thus it is difficult to integrally modulize the display panel 110 and the multi panel 140. In case that a thickness of the optical adhesive layer 150 may be 25 µm or greater, a folding of the flexible display device 100 is difficult.

Thus, the flexible display device 100 may have a thin profile.

In other words, in the flexible display device 100, the multi-panel 140 may be formed at a thickness of about 40 µm, the cover window 300 may be formed at a thickness of about 30 µm, the surface treatment layer 330 may be formed at a thickness of about 5 µm, and the optical adhesive layer 150 may be formed at a thickness of at most 25 µm. Thus, the window member 200 of the flexible display device 100 of this embodiment may be formed at a total thickness of about 100 µm or less.

Particularly, the window member 200 may have an excellent scratch resistance because the cover window 300 has a high hardness of at least 7H or at least 9H, and may have a thin profile at a total thickness of about 100 µm or less.

Accordingly, the flexible display device 100 may realize a thin profile, and further, may be extremely folded inwardly and outwardly.

The flexible display device 100 including the window member 200 having a thickness of about 100 µm or less may have a radius of curvature up to 1R when inwardly folded, and thus an extreme inward folding may be possible. Such the flexible display device 100 may have a radius of curvature up to 3R when outwardly folded, and thus an extreme outward folding may be possible.

Figure 4:
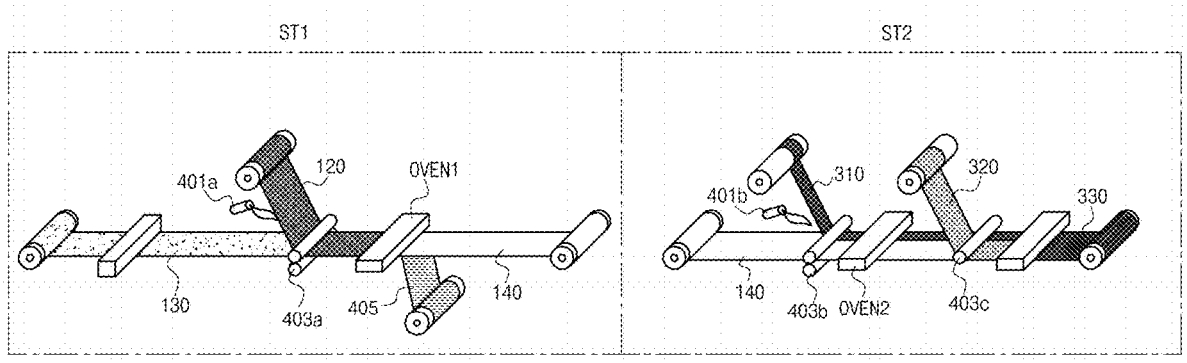
FIG. 4 is a view schematically illustrating processes of manufacturing a window member according to a second embodiment of the present invention.
Figure 5:
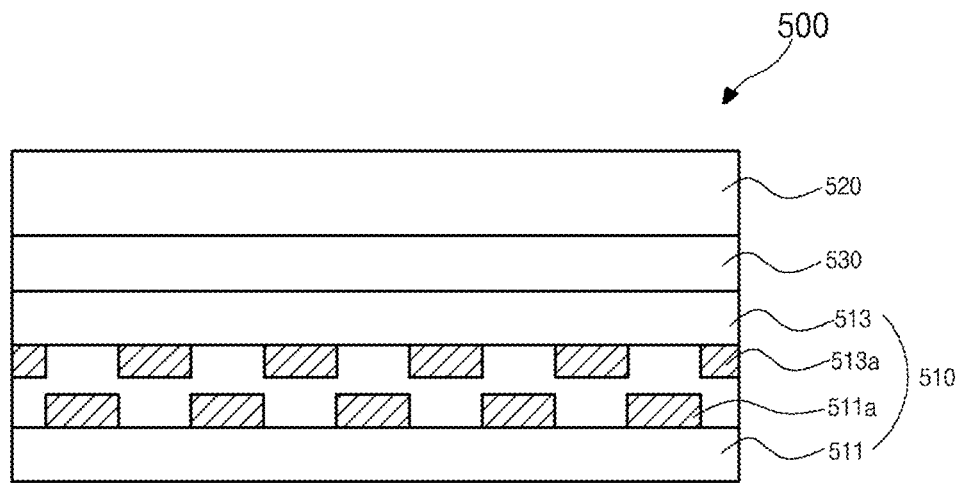
FIG. 5 is a cross-sectional view illustrating a general window member.

FIG. 4 is a view schematically illustrating processes of manufacturing a window member according to a second embodiment of the present invention, and FIG. 5 is a cross-sectional view illustrating a general window member.

Referring to FIG. 4, processes of manufacturing a window member of the flexible display device of this embodiment may roughly include a step ST1 of forming a multi panel and a step ST2 of forming a cover window.

In the step ST1 of forming the multi panel, a touch layer 120 may be provided over a polarization layer 130, which is wound around a roller, in a roll to roll method, a UV adhesive 401a may be coated between the polarization layer 130 and the touch layer 120, and a lamination step may be conducted using a first laminating roller 403a.

Through the lamination step, the polarization layer 130 and the touch layer 120 are attached to each other. In the touch layer 120, a plurality of first touch electrodes (121 of FIG. 3C) may be located on a base film 405 and be spaced apart from each other, a dielectric layer (125 of FIG. 3C) may be located on the plurality of first touch electrodes, and a plurality of second touch electrode (123 of FIG. 3C) may be located on the dielectric layer and be arranged alternately with the plurality of first touch electrodes.

The polarization layer 130 and the touch layer 120 attached to each other may be placed in a first oven OVEN1 and a drying step may be conducted. Then, the base film 405 of the touch layer 120 may be wound and removed from the touch layer 120, and thus the multi panel 140 may be formed finally.

The step ST2 of forming a cover window may be conducted. A first cover portion 310 may be provided over a region of the multi panel 140, an adhesive 401b may be coated between the multi panel 140 and the first cover portion 310, and a lamination step may be conducted using a second laminating roller 403b.

Then, the multi panel 140 attached to the first cover portion 310 may be placed in a second oven OVEN2 and a drying step may be conducted. Then, a second cover portion 320 may be provided over other region of the multi panel 140, where the first cover portion 310 is not formed, and the second cover portion 320 and the multi panel 140 may be attached to each other.

In this regard, a lamination step may be conducted using a third laminating roller 403c for the second cover portion 320 and the multi panel 140 so that the second cover portion 320 and the multi panel 140 may be attached to each other. Thus, both of the first and second cover portions 310 and 320 may be finally attached onto the multi panel 140.

A surface treatment step may be conducted for a top of the first and second cover portions 310 and 320 attached to the multi panel 140 so that a surface treatment layer 330 may be formed on the first and second cover portions 310 and 320.

Lastly, even though not shown in the drawings, a cutting step may be conducted suitably to a size of the flexible display device (100 of FIG. 3C). Accordingly, the window member (200 of FIG. 2C) of this embodiment may be manufactured.

Since the multi panel 140 of this embodiment may be configured with the polarization layer 130 and the touch layer 120 which are formed integrally through the lamination step using the roll to roll method, the multi panel 140 may be formed at a thickness of 40 μm or less.

Referring to FIG. 5, a general touch member 500 includes a general touch panel 510 and a polarization layer 520. The general touch panel 510 includes a first touch film 511 where a first touch electrode 511a is formed, and a second touch film 513 where a second touch electrode 513a is formed, and the touch panel 510 has a thickness of at least 40 μm.

The polarization layer 520 has a thickness of at least 50 μm, and an optical adhesive layer 530 having a thickness of 10 μm to 50 μm is interposed between the polarization layer 520 and the touch panel 510. The general window member 500 only including the polarization layer 520 and the touch panel 510 has a thickness of at least 100 μm.

In addition to the above components, the window member 200 further includes a cover window, an optical adhesive layer to attach the cover window and the polarization layer 520, and an optical adhesive layer to attach the touch panel 510 and a display panel. Thus, the general window member usually has a thickness of 300 μm or greater.

On the other hand, the flexible display device of this embodiment may provide the window member (200 of FIG. 3C) having a high hardness and a total thickness of about 100 μm or less as well.

Accordingly, the flexible display device of this embodiment may realize a thin profile, and further, may be extremely folded inwardly and outwardly.

The flexible display device 100 including the window member 200 having a thickness of about 100 μm or less may have a radius of curvature up to 1R when inwardly folded, and thus an extreme inward folding may be possible. Such the flexible display device 100 may have a radius of curvature up to 3R when outwardly folded, and thus an extreme outward folding may be possible.

As described above, in the flexible display device of this embodiment, the first cover portion having an elastic modulus and a surface hardness of 9H or greater may be located at the first non-folding region and the first folding region as the outer folding portion which an external impact is relatively more applied to, and the second cover portion having a relatively greater elastic modulus may be located at the inner folding portion. Thus, the flexible display device capable of being extremely folded inwardly and outwardly and having an improved durability may be provided.

Particularly, the cover window may be located at the first and second folding regions and the first to third non-folding regions as well, and thus durability of the flexible display device may be further improved. Accordingly, reduction of continuity of image and no touch recognition by the first and second folding regions may be solved.

Further, since the cover window may be formed with the separated first and second cover portions, production cost may be reduced along the above technical advantages, and thus production efficiency may be improved.

Further, the window member including the cover window may be configured to have an integral structure by a roll to roll method or roll to sheet method. Thus, the flexible display device having a thin profile may be provided.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A flexible display device, comprising:
    a display panel which display an image, and includes a first folding region folded or unfolded around a first folding axis, and first and second non-folding regions respectively located at both sides of the first folding region; and
    a cover window which is on the display panel, and includes a first cover portion having a first hardness and a second cover portion having a second hardness less than the first hardness,
    wherein the first cover portion is located corresponding to an outer folding portion a display surface of which is exposed to an outside,
    wherein the first non-folding region is comprised of the first cover portion of the cover window, and the second non-folding region is comprised of the second cover portion of the cover window, and
    wherein the first cover portion is not located at a region of the cover window corresponding to the second non-folding region.

2. The flexible display device of claim 1, wherein the second non-folding region is rotated clockwise with respect to the first folding axis, and
    wherein the first non-folding region and a part of the first folding region is included in the outer folding portion.

3. The flexible display device of claim 2, wherein the first cover portion is located from the first non-folding region to a center portion of the first folding region, and to 0.98R (mm) from the center portion O of the first folding region.

4. The flexible display device of claim 3, wherein the second cover portion is located at a region of the cover window other than a region where the first cover portion is located.

5. The flexible display device of claim 1, wherein a surface hardness of the first hardness is 9H or greater, and a surface hardness of the second hardness is 7H or less.

6. The flexible display device of claim 5, wherein the first and second cover portions each have a thickness of 30 μm or less.

7. The flexible display device of claim 6, wherein the first cover portion is formed of aluminosilicate glass.

8. The flexible display device of claim 6, wherein the second cover portion is formed of one of polymethylmethacrylate (PMMA), polycarbonate (PC), cycloolefin polymer (COP), polyethylene terephthalate (PET), polyimide (PI), or polyaramid (PA).

9. The flexible display device of claim 8, wherein the second cover portion includes a hard coating layer or hard coating ingredients.

10. The flexible display device of claim 1, further comprising a surface treatment layer which has at least one of an anti-reflection function, an anti-glare function, and an anti-finger function.

11. The flexible display device of claim 1, further comprising a multi panel which is between the display panel and the cover window, and includes a polarization layer and a touch layer.

12. The flexible display device of claim 11, wherein the polarization layer and the touch layer are laminated by a roll to roll method or roll to sheet method, and
    wherein the multi panel has a thickness of 40 μm or less.

13. The flexible display device of claim 1, wherein the display panel includes a second folding region which is located at a side of the second non-folding region and is folded or unfolded around a second folding axis, and a third non-folding region which is located at a side of the second folding region,
and
   wherein the first non-folding region and a part of the first folding region is included in the outer folding portion, and
   wherein the third non-folding region is comprised of the second cover portion of the cover window.

\* \* \* \* \*